Figure 1:
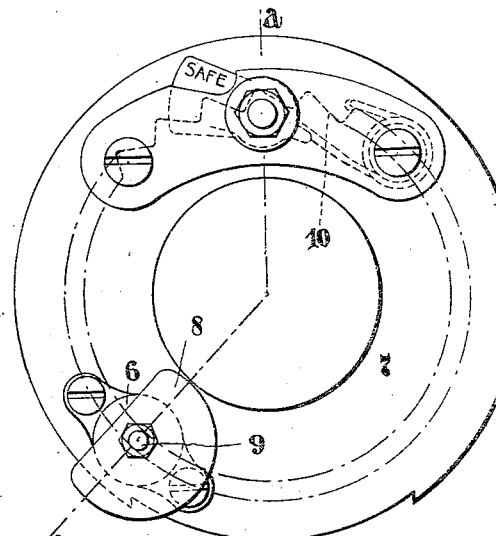

J. V. PUGH & F. POUNTNEY.
DETACHABLE WHEEL.
APPLICATION FILED AUG. 26, 1910.

1,145,702.

Patented July 6, 1915.
3 SHEETS—SHEET 1.

Inventors.
John V. Pugh,
Frank Pountney,

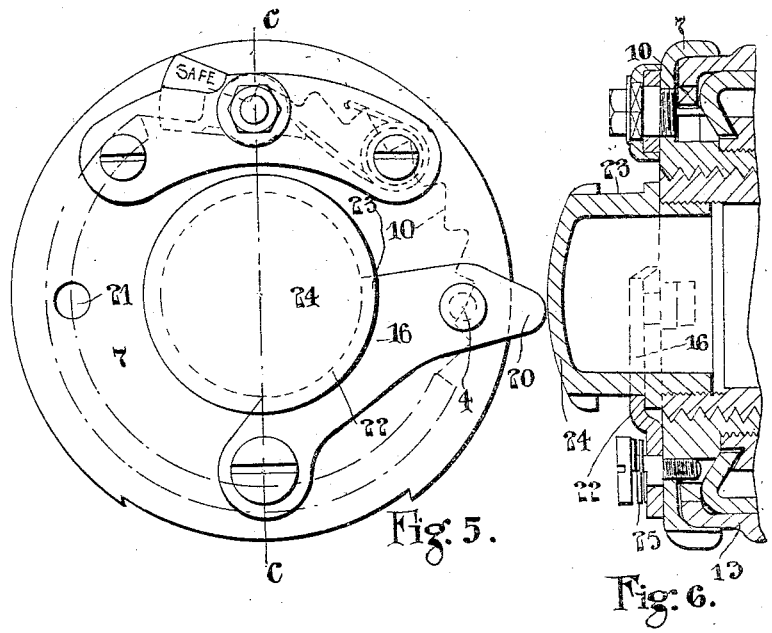
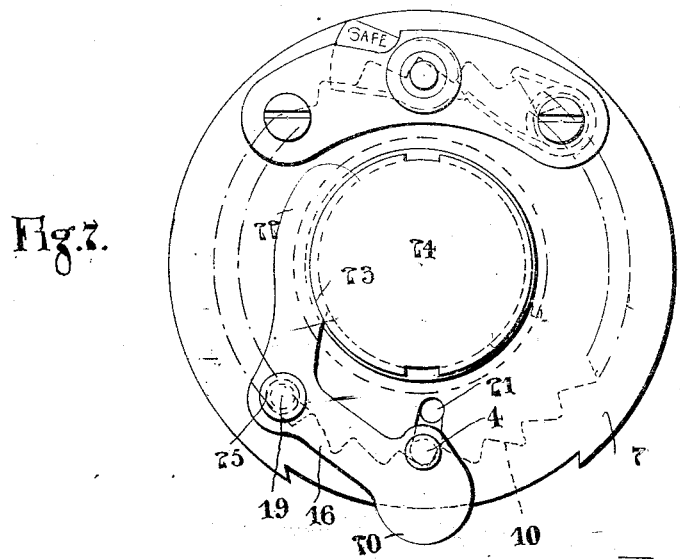

J. V. PUGH & F. POUNTNEY.
DETACHABLE WHEEL.
APPLICATION FILED AUG. 26, 1910.

1,145,702.

Patented July 6, 1915.
3 SHEETS—SHEET 3.

Attest:
Bent W. Stahl
Edward N. Saxton

Inventors,
John V. Pugh
Frank Pountney
by Spear, Middleton, Donaldson & Spear
Attys

UNITED STATES PATENT OFFICE.

JOHN VERNON PUGH, OF ALLESLEY, AND FRANK POUNTNEY, OF COVENTRY, ENGLAND.

DETACHABLE WHEEL.

1,145,702.  Specification of Letters Patent.  Patented July 6, 1915.

Application filed August 26, 1910. Serial No. 579,146.

*To all whom it may concern:*

Be it known that we, JOHN VERNON PUGH, a subject of the King of Great Britain and Ireland, and residing at Guiting House, Allesley, in the county of Warwick, and FRANK POUNTNEY, a subject of the King of Great Britain and Ireland, and residing at 2 Barras Lane, Coventry, in the county of Warwick, England, have invented certain new and useful Improvements in and Relating to Detachable Wheels, of which the following is a specification.

This invention relates to detachable wheels of the type in which a detachable hub part is mounted upon a permanent hub part. In such wheels it is usual to hold the outer hub part upon the inner by screwing means provided with a locking device to prevent loosening thereof, a suitable spanner being used to screw on or to unscrew the screwing means. Hitherto, however, it has always been possible for the outer hub part to become loose on the permanent hub part or even entirely to come off should it happen that the locking device was destroyed either by accident or by misuse.

The object of the present invention is to provide improved screwing and locking means which shall not be able to become loosened should the ordinary locking means be rendered inoperative through any cause.

The invention consists in a screwing and locking means for detachable wheels in which a device separate from and in addition to the ordinary locking means engages with one of the hub parts to prevent loosening of the screwing means, said device being capable of disengagement when it is required to remove the detachable hub part off the inner part. It is preferable that this device shall be adapted to prevent the positioning of a spanner on the screwing and locking means for the purpose of unscrewing the same until the device has been disengaged from the hub part in order to avoid the damage that would be caused by trying to effect such unscrewing before the disengagement of the device.

The invention also consists in a screwing and locking means for detachable wheels having a lock nut or ring carrying a pawl locking device and a separate independent element engaging the castellations on the outer hub part with which the pawl locking device engages or with a separate series of castellations or holes or the like on one of the hub parts, this element being provided with means external to the lock nut or ring whereby it is moved into and out of its engaging position, a part of said means projecting beyond the lock nut or ring in the engaged position of the separate element to prevent the positioning of a spanner upon the lock nut or ring to unscrew the same.

Another object of the invention is to prevent the unscrewing of said screwing and locking means if it should happen that both the ordinary locking means and the independent locking device were to fail and also to prevent the detachable hub part from coming entirely off the inner hub part should the thread by which the screwing and locking means screws on to the permanent hub part become stripped.

The invention also consists in providing a member adapted to engage with a groove, recess or the like in a part of the inner hub part or axle projecting beyond the screwing and locking means, whereby the withdrawal of the screwing and locking means from the permanent hub part, so long as this member is in engagement with said groove, recess or the like, is prevented, this member being in the form of a spring or jointed ring or the like or carried by the means for moving the independent locking device into and out of its engaged and disengaged positions.

The invention further consists in the safety devices hereinafter indicated.

Figure 2:
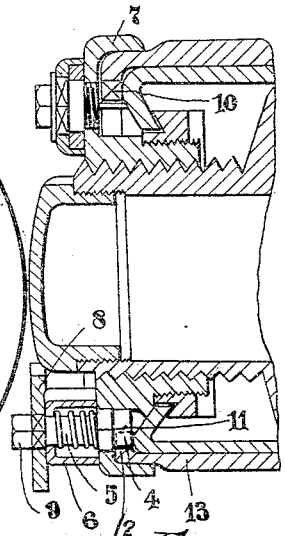
Figure 3:
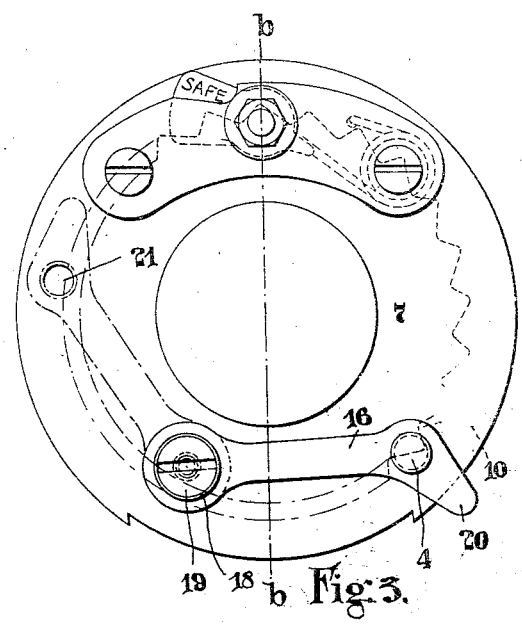
Figure 4:
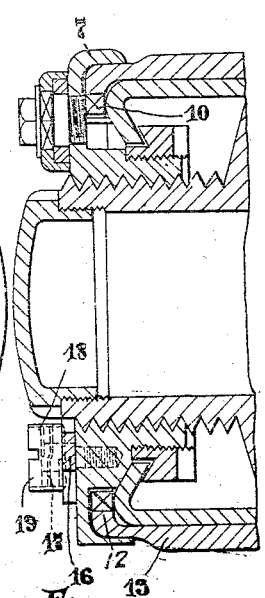
Figures 8, 9:
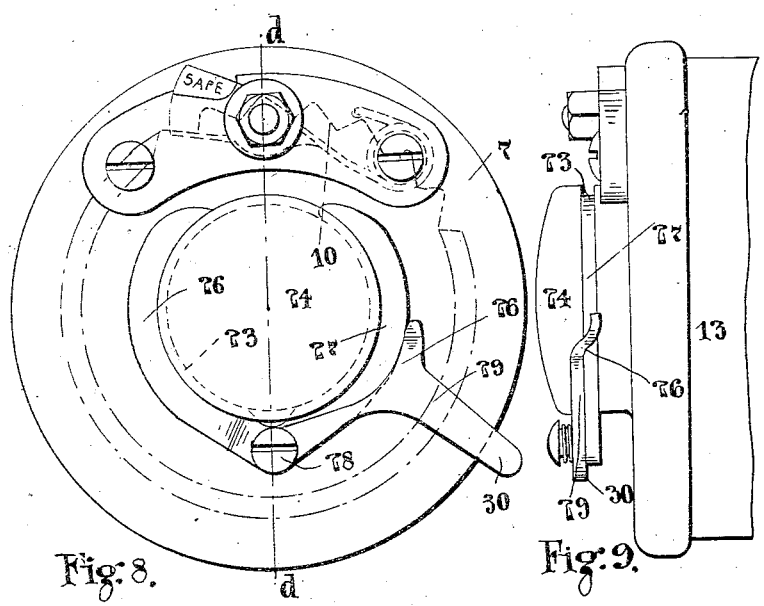
Figure 10:
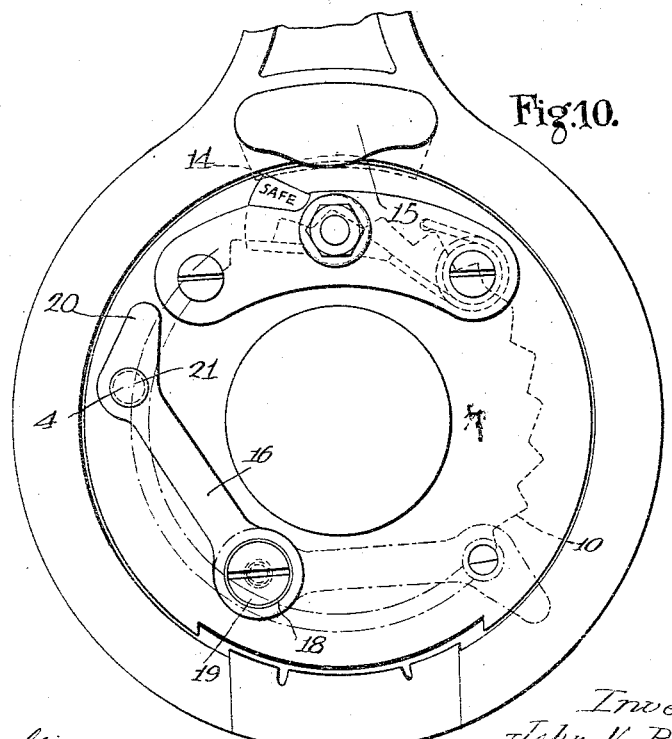

Referring now to the accompanying drawings, Figures 1 and 2 represent one method of carrying the invention into effect, Fig. 2, being a section on the line $a, a$, of Fig. 1. Figs. 3 and 4 represent another modification, Fig. 4 being a section on the line $b, b$, of Fig. 3, while Figs. 5 and 6 show a modification of this arrangement. Fig. 6 being a section on the line $c, c$, of Fig. 5. Fig. 7 represents a further modification. Figs. 8 and 9 represent a form of device for carrying part of the invention into effect. Fig. 9 being a side view of the arrangement shown in Fig. 8. Fig. 10 represents a spanner or like tool applied to the type of lock ring shown in Figs. 3 and 4.

In carrying this invention into effect as applied to a lock ring having an automatic pawl locking device as illustrated in any of the foregoing figures we provide in addition to this pawl device a separate and independent device which may engage with the same series of castellations as that which the automatic pawl locking device engages or we may provide a second series of castellations, holes or the like which may be placed on either the inner or outer hub parts.

According to one modification, as shown in Figs. 1 and 2, the independent pawl 4 is provided with a stem, 5, extending through a cap, 6, attached to the exterior face of the lock ring, 7, the projecting end of the stem being formed of a square, knurled or other non-slipping shape to which is attached a D shaped member, 8, secured on the pawl stem, 5, by the nut, 9, or by a screw or other suitable means. The D shaped member, 8, is shown in the position it assumes when the pawl, 4, is in its engaging position with the ratchet teeth, 10, and in this position it is impossible to place a spanner on the lock ring 7, to unscrew the same until the pawl, 4, has been turned into its disengaged position, in which the flat side of the D shaped member, 8, is substantially at right angles to the position shown in the drawings and is substantially parallel to the periphery of the locking ring 7. Over the pawl stem, 5, and within the cap, 6, attached to the lock ring, 7, is placed a spiral spring 11. When it is required to move the pawl, 4, into its disengaged position the spring 11, is compressed by pulling on the D shaped member, 8. In this manner the pawl, 4, is drawn out of engagement with the ratchet teeth, 10, and can then be turned by the D shaped member, 8, so as to rest on the internal flange 12 of the outer hub part 13, in which these ratchet teeth are formed.

The spanner consists of a circular ring with a projecting handle and carries, as shown in Fig. 10, a flange piece 14, which engages behind the lock ring and which therefore requires that the part of the circle adjacent to the handle is first placed upon the lock nut with the flange, 14, behind the rim thereof, the opposite side being then tilted forward until the spanner completely surrounds the lock ring. The D shaped member, 8, in the position shown is made of such dimensions as to extend into the path of the spanner when thus moved, and thus prevents the spanner being placed in position on the lock ring 7. When the pawl, 4, is however, in its disengaged position and the D shaped member, 8, is therefore at right angles to the position shown the flat side thereof does not extend into the path of the spanner, and the latter can therefore be positioned on the ring 7. A flange piece 15 may also be provided on the front face of the spanner to engage with the ordinary automatic pawl.

In another method of carrying this invention into effect, which is shown in Figs. 3 and 4, the independent pawl, 4, is attached at one end of a lever 16 which is pivoted at the other end to the lock ring 7. The pawl, 4, is kept in position by a spiral spring 17, contained within a cup, 18, this spring 17, being caused to press on the pawl lever 16, by means of the screw 19, which forms the pivot for this lever. A portion 20, of the lever, 16, preferably extends as shown over the edge of the lock ring, 7, to prevent the spanner being placed thereon to unscrew the same while the pawl, 4, is in its engaged position. When it is desired to move the pawl 4, into its disengaged position the pawl is withdrawn through the hole in the lock ring, 7, by means of this projecting part 20, and the lever, 16, is then rotated about its pivot 19, so that the pawl, 4, bears upon another part of the lock ring, 7, in such a manner that no part of the lever, 16, extends beyond the periphery of the lock ring. This position is shown by dotted lines in Fig. 3. A small recess 21, or the like may be formed in the lock ring, 7, to position the pawl, 4, and lever 16, in the disengaged position. The lever, 16, may as shown in Figs. 5 and 6, be formed with a part, 22, adapted to engage with a groove or recess 23, or the like formed in the projecting end of the inner hub part or in the cap 24, which closes the permanent hub part or in the axle itself. By this means the withdrawal of the lock ring, 7, off the inner hub part in the event of both the ordinary and independent locking means failing or of the thread by which the locking ring screws on to the permanent hub part, stripping is prevented. In this latter arrangement a flat spiral spring 25, is used to press on the pawl and this spring is not inclosed within a cup.

In another modification shown in Fig. 7, the lever, 16, is pivoted in a mid position and is provided at one end with a portion, 22, adapted to engage with a recess or groove, 23, or the like in the projecting end of the inner hub part and at the other end of this lever, 16, is placed a pawl, 4, adapted to project through a hole in the lock ring, 7, to engage with the ratchet teeth 10, of the outer hub part and also this end of the lever is formed with a part 20, projecting beyond the edge of the lock ring. A flat spiral spring, 25, is preferably inserted between the lever 16, and the head of the screw 19, about which the lever is pivoted. When it is required to disengage the pawl, 4, from the ratchet teeth, 10, the pawl is withdrawn from the hole in the lock ring, 7 by means of the projecting end, 20, of the lever, 16, the spring, 25, between the lever, 16, and the head of the pivot screw, 19, allowing of this movement. The lever, 16, is then moved so that the pawl, 4, engages with the recess 21, in the face of the lock ring 7, which recess is so situated that the movement of the lever withdraws the projecting part, 20, within the edge of the lock ring and removes the other end, 22, of the lever, 16, out of engagement with the recess 23, or the like formed in the nut, 24, closing the end of the inner hub part.

In all forms, the independent locking device should be so placed with respect to the ordinary pawl locking means that they can fall into their engaging position without actually touching the ratchet teeth, 10, so as to allow for slight irregularities in the form of the ratchet teeth and also to allow for the lock ring or nut, 7, being screwed around farther than the position in which the point of the ordinary pawl fits into the root of the ratchet teeth. In another way of carrying this part of the invention into effect when it is only required to prevent the withdrawal of the lock ring in the event of the locking device failing, or of the thread by which this lock ring screws on to the inner hub part stripping, we may use as shown in Figs. 8 and 9, a caliper-like clip to engage with a recess, 23, in the end of the inner hub part or of the cap, 24, closing the inner hub part, as shown, or of the projecting axle itself. The caliper-like clip is preferably formed of two C shaped pieces, 26 and 27, pivoted together at 28. The piece 26 it will be seen extends beyond the point of pivoting and is adapted when the clip is placed in the recess, 23, to spring behind the other piece, 27, as shown and so hold the clip in position. When it is desired to remove the clip from the recess, 23, the end, 29, of the piece, 26, is raised so as to slide down the side of the other piece, 27, thus causing the two pieces, 26 and 27, to move about their common pivot, 28, thus opening the clip and allowing it to be removed from the recess. This clip may be provided, as shown, with a part, 30, arranged to project over the edge of the lock ring, 7, to prevent the positioning of a spanner thereon until the clip has been disengaged and removed from the groove 23.

It is evident that the independent pawl locking device may be used in connection with any form of ordinary pawl locking device and in connection with any form of lock ring or nut.

Having now particularly described the nature of our invention, we declare that what we claim as new and desire to protect by Letters Patent is:—

1. In combination in a detachable wheel an inner and an outer hub part, a member securing the outer part upon the inner part, means which are applied for removing said member, and spring retained means which may be placed in a position to prevent said removal and while in such position also prevents the application of said removing means.

2. In combination in a detachable wheel an inner and an outer hub part, a screw threaded member securing the outer part upon the inner part, engaging teeth formed upon one of said hub parts, said member having a hole therein; a withdrawable catch projecting through said hole to prevent rotation of said member by engaging said teeth, a wrench for rotating said member and means connected to said catch which prevent the application of said wrench except when said catch is withdrawn from said teeth.

3. In combination in a detachable wheel an inner and an outer hub part, a member securing the outer part upon the inner part, means which are applied to effect the removal of said member, and a bar movably mounted upon said member, which in one position prevents the application of said removal means and the removal of said member and in another allows such application and removal.

4. In combination in a detachable wheel an inner and an outer hub part, a screw threaded member securing the outer part upon the inner part, a substantially circular rim to said member, an encircling spanner which is applied to said rim to rotate said member, engaging teeth on one of said hub parts, an arm pivoted on said member, a catch on said arm, projecting through a hole in said member to engage with said teeth, a part of said arm projecting beyond the edge of said rim to prevent the application of said spanner when said catch is so engaged, said member having a second hole wherein said catch may be placed and in which position it is free of said teeth, and said arm lies entirely within said rim.

5. In combination in a detachable wheel an inner and an outer hub part, a screw threaded member securing the outer part upon the inner part, engaging teeth on one of said hub parts, an arm pivoted on said member, a catch on said arm, said member having a hole through which said catch may project to engage with said teeth, and prevent rotation of said member and means for holding said catch free of said teeth.

6. In combination in a detachable wheel an inner and an outer hub part, a screw threaded member securing the outer part upon the inner part, engaging teeth on one of said hub parts, an arm pivoted on said member, a catch on said arm, said member having a hole through which said catch may project to engage with said teeth, and prevent rotation of said member, a spring pressing upon said arm to retain said catch in said hole, said member having a second hole wherein said catch may be retained by said spring and in which it is free of said teeth.

7. In combination in a detachable wheel an inner and an outer hub part, an indentation in one of said parts, a member securing the outer part upon the inner part, means to effect the removal of said member and a device which engages with said indentation, and while so engaged prevents the removal of said member and the application thereto of said removal means.

8. In combination a screw threaded element, a nut member screwed thereon, a resilient catch device operable to prevent removal of said nut, means for encircling said nut to rotate the same and a projection on said catch device which while the same is in action prevents the application of said rotating means.

In testimony whereof, we affix our signatures in presence of two witnesses.

JOHN VERNON PUGH.
FRANK POUNTNEY.

Witnesses:
FLORENCE SKINNER,
DOROTHY PURNELL.